United States Patent
Frank et al.

(10) Patent No.: US 7,733,839 B1
(45) Date of Patent: Jun. 8, 2010

(54) DYNAMIC SOCKET WAVEFORM

(75) Inventors: Robert J. Frank, Cedar Rapids, IA (US); Karl F. Hoech, Cedar Rapids, IA (US); Gunther B. Frank, Robins, IA (US); Carlos J. Chavez, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 793 days.

(21) Appl. No.: 11/338,233

(22) Filed: Jan. 24, 2006

(51) Int. Cl.
*H04J 1/00* (2006.01)
(52) U.S. Cl. .................. 370/343; 370/329; 370/330; 370/344; 455/552.1; 455/553.1; 455/450; 455/451; 455/452.1; 367/77; 367/78; 367/79; 367/80
(58) Field of Classification Search .............. 455/450, 455/451, 452.1, 452.2, 550.1, 552.1, 553.1, 455/63.1, 67.13, 73, 77, 95, 103, 132; 370/310, 370/328, 329, 330, 338, 431, 343, 344; 367/77, 367/78, 79, 80
See application file for complete search history.

(56) References Cited

U.S. PATENT DOCUMENTS

| | | | |
|---|---|---|---|
| 6,650,655 B2 * | 11/2003 | Alvesalo et al. | 370/468 |
| 2006/0084444 A1 * | 4/2006 | Kossi et al. | 455/450 |
| 2006/0217137 A1 * | 9/2006 | Kushalnagar et al. | 455/501 |
| 2006/0229029 A1 * | 10/2006 | Waltho et al. | 455/73 |
| 2007/0093214 A1 * | 4/2007 | Sanders et al. | 455/72 |
| 2007/0213046 A1 * | 9/2007 | Li et al. | 455/425 |
| 2008/0144524 A1 * | 6/2008 | Hershey et al. | 370/254 |

* cited by examiner

*Primary Examiner*—Charles N Appiah
*Assistant Examiner*—Olumide T Ajibade Akonai
(74) *Attorney, Agent, or Firm*—Matthew J. Evans; Daniel M. Barbieri

(57) ABSTRACT

A system capable of operation with dynamic sockets includes a plurality of communications devices. Each of the plurality of communications devices includes high band channel radio resources capable of communications at 900-2800 MHz and socket radio resources capable of communications at 30-1000 MHz. The high band channel radio resources and the socket radio resources are significantly separated in frequency so that the high band channel radio resources and the socket radio resources are suitable for concurrent operation with no interference and minimal isolation, co-site problems to solve in each of the plurality of communications devices. The plurality of communications devices are connected to a unifying mesh network by the high band channel radio resources. The unifying mesh network is suitable for allowing the plurality of communications devices to communicate with one another. When data needs to be transferred among a group of communications devices, a dynamic socket connection is negotiated on the unifying mesh network and is then formed with the socket radio resources. The dynamic socket formation is suitable for allowing the unifying mesh network to offload continuous receiver-directed or multicast traffic from the unifying mesh network channel and to free up public ad hoc communications bandwidth of the unifying mesh network.

15 Claims, 4 Drawing Sheets

DYNAMIC SOCKET WAVEFORM

CROSS-REFERENCE TO RELATED DOCUMENTS

The present application herein incorporates co-pending U.S. patent application Ser. No. 11/338,307, filed Jan. 24, 2006 by reference in its entirety.

FIELD OF THE INVENTION

The present invention relates generally to communications and particularly to a communications device and system capable of operation with dynamic sockets and a method of operation with dynamic sockets.

BACKGROUND OF THE INVENTION

Software Defined Radios (SDRs) methodology is rapidly gaining favor as a way to architect and design radio communication systems with greatly improved interoperability and ability to accommodate future waveform variants. SDR refers to wireless communication in which the transmitter modulation is generated or defined by a computer, and the receiver uses a computer to recover the signal intelligence. To select the desired modulation type, the proper programs are run by microcomputers that control the transmitter and receiver. A typical voice SDR transmitter, such as may be used in mobile two-way radio or cellular telephone communication, include the following stages, where items followed by asterisks represent computer-controlled circuits whose parameters are determined by the programming (software): (1) Microphone; (2) Audio amplifier; (3) Analog-to-digital converter (ADC) that converts the voice audio to digital data*; (4) Modulator that impresses the digital intelligence onto a radio-frequency (RF) carrier*; (5) Series of amplifiers that boosts the RF carrier to the power level necessary for transmission; and (6) Transmitting antenna. A typical receiver designed to intercept the above-described voice SDR signal may employ the following stages, essentially reversing the transmitter's action, where items followed by asterisks represent programmable circuits: (1) Receiving antenna; (2) Superheterodyne system that boosts incoming RF signal strength and converts it to a lower frequency; (3) Demodulator that separates the digital intelligence from the RF carrier*; (4) Digital-to-analog converter (DAC) that generates a voice waveform from the digital data*; (5) Audio amplifier; and (6) Speaker, earphone, and/or headset. The most significant asset of SDR is versatility. Wireless systems employ protocols that vary from one service to another. Even in the same type of service, for example, cellular telephones, the protocol often differs from country to country. A single SDR set with an all-inclusive software repertoire may be used in any mode, anywhere in the world. Changing the service type, the mode, and/or the modulation protocol involves simply selecting and executing the requisite computer program. The ultimate goal of SDR engineers is to provide a single radio transceiver capable of playing the roles of cordless telephone, cell phone, wireless fax, wireless e-mail system, pager, wireless videoconferencing unit, wireless Web browser, Global Positioning System (GPS) unit, and other functions still in the realm of science fiction, operable from any location on the surface of the earth, and perhaps in space as well.

With a growing demand for wireless applications and the fixed RF spectrum, research programs such as Defense Advanced Research Projects Agency (DARPA)'s neXt Generation (XG) are examining the possibility of re-application of spectral resources in an ad hoc manner by sensing current usage and temporarily claiming unused portions of the RF spectrum. To date, programs have proposed or demonstrated a limited set of waveforms for application on XG. However, with the emergence of SDRs, the possibility exists not only for detection of spectral re-use opportunities and filling with a fixed or parameterized waveform such as Orthogonal Frequency Division Multiplexing (OFDM) or the like, but also for selection of more comprehensive waveform characteristics such as modulation, channel coding, and TRANsmission SECurity (TRANSEC) algorithms.

Quint Networking Technology (QNT) is a DARPA-led technology program to produce a very small and modular digital communications system for a variety of ground and airborne applications. QNT may be used by dismounted air controllers and incorporated into weapons and small unmanned air vehicles (UAVs) so that these platforms may network with tactical aircraft and unmanned combat air vehicles (UCAVs) in order to better synchronize airborne and ground activities, as well as provide enhanced targeting information. The program may combine hardware miniaturization and special software to enable ad hoc bandwidth allocation to meet the dynamic demands of combat operations. The program may be targeting connectivity between dismounted soldiers, small UAVs, tactical UAVs, weapons, and manned aircraft. Low power, small size, link robustness, high throughput, low latency, mobility and ad hoc connectivity are driving requirements for the QNT system. QNT may bring historically disadvantaged users and platforms into the Global Information Grid (GIG) as active participants and extends new levels of capability to disposable low cost radios.

One key to QNT success is to maintain highly dynamic ad hoc operation such as is accomplished with Tactical Targeting Network Technology (TTNT)/TTNT SFF (Small Form Factor) while operating for long periods of time in a low power, small form factor, battery powered device over significant distances. Thus, for power, propagation, and computational efficiency reasons, it is desirable to provide a method and system for leveraging the TTNT ad hoc behavior and extends it to the UHF (Ultra High Frequency)/VHF (Very High Frequency) bands.

SUMMARY OF THE INVENTION

In a first exemplary aspect of the present invention, a communications device capable of operation with dynamic sockets is provided. The communications device includes high band channel radio resources capable of communications at 900-2800 MHz, and socket radio resources capable of communications at 30-1000 MHz. The high band channel radio resources and the socket radio resources are significantly separated in frequency so that the high band channel radio resources and the socket radio resources are suitable for concurrent operation with no interference and minimal isolation, co-site problems to solve in the communications device.

In an additional exemplary aspect of the present invention, a system capable of operation with dynamic sockets is provided. The system includes a plurality of communications devices. Each of the plurality of communications devices includes high band channel radio resources capable of communications at 900-2800 MHz and socket radio resources capable of communications at 30-1000 MHz. The high band channel radio resources and the socket radio resources are significantly separated in frequency so that the high band channel radio resources and the socket radio resources are suitable for concurrent operation with no interference and minimal isolation, co-site problems to solve in each of the plurality of communications devices. The plurality of communications devices are connected to a unifying mesh network by the high band channel radio resources. The unifying mesh network is suitable for allowing the plurality of communications devices to communicate with one another. When data needs to be transferred among a group of communications devices, a dynamic socket connection is negotiated on the unifying mesh network and is then formed with the socket radio resources. The dynamic socket formation is suitable for allowing the unifying mesh network to offload continuous receiver-directed or multicast traffic from the unifying mesh network channel and to free up public ad hoc communications bandwidth of the unifying mesh network.

In another exemplary aspect of the present invention, a method of operation with dynamic sockets is disclosed. A plurality of communications devices is provided. Each of the plurality of communications devices includes high band channel radio resources capable of communications at 900-2800 MHz and socket radio resources capable of communications at 30-1000 MHz. The high band channel radio resources and the socket radio resources are significantly separated in frequency so that the high band channel radio resources and the socket radio resources are suitable for concurrent operation with no interference and minimal isolation, co-site problems to solve in each of the plurality of communications devices. The plurality of communications devices is connected to a unifying mesh network by the high band channel radio resources. The unifying mesh network is suitable for allowing the plurality of communications devices to communicate with one another. When data needs to be transferred among a group of communications devices, a dynamic socket connection is negotiated on the unifying mesh network. The dynamic socket connection is formed with the socket radio resources for allowing the unifying mesh network to offload continuous receiver-directed or multicast traffic from a channel of the unifying mesh network and to free up public ad hoc communications bandwidth of the unifying mesh network.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
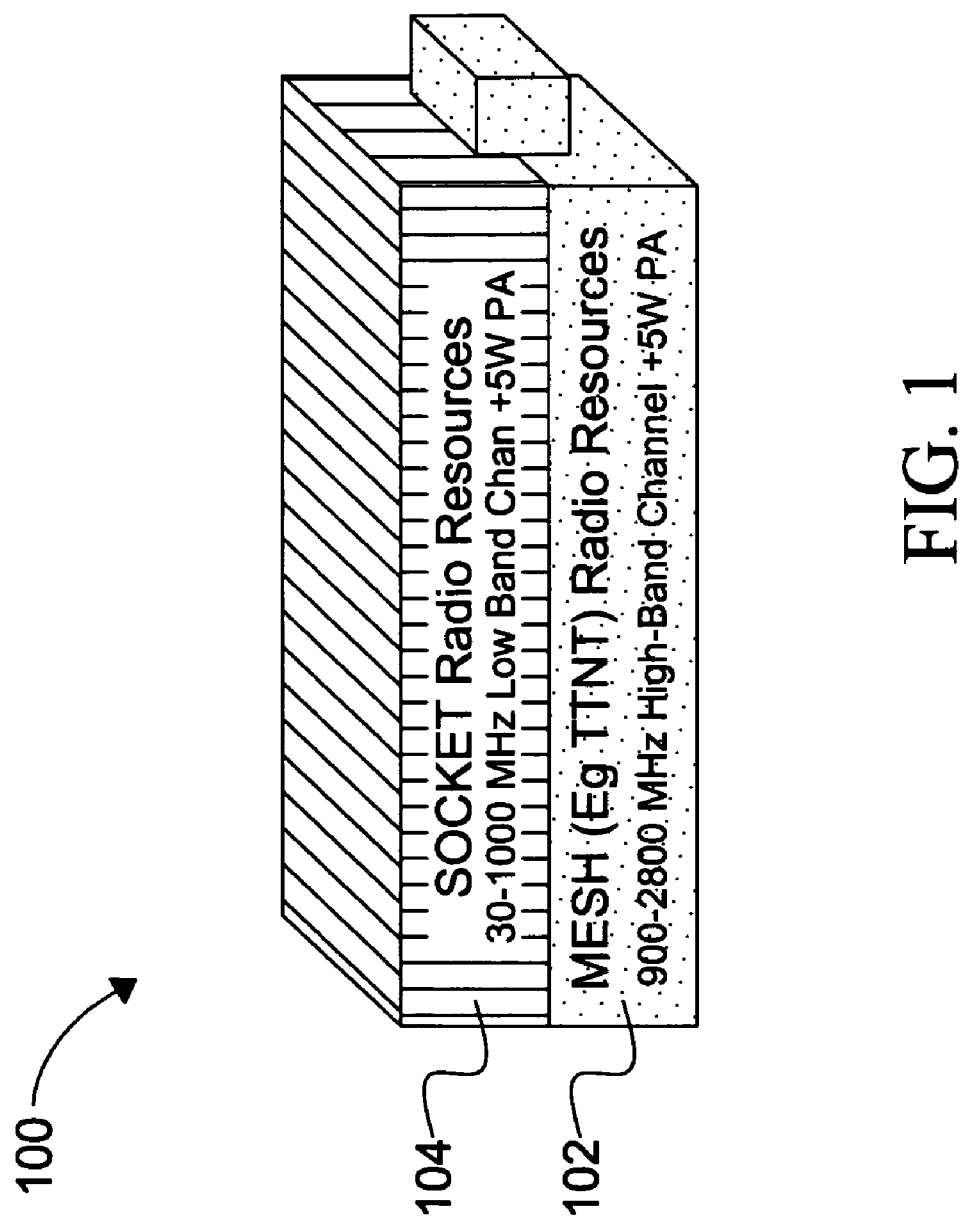
FIG. 1 is a schematic diagram illustrating a communications device capable of operation with dynamic sockets in accordance with an exemplary embodiment of the present invention.

Reference will now be made in detail to the presently preferred embodiments of the invention, examples of which are illustrated in the accompanying drawings.

In one aspect, the present invention leverages the TTNT ad hoc behavior and extends it to the UHF/VHF bands through dynamic socket waveform to enhance power, propagation, and computational efficiency. A socket is a form of inter-process communication used to form one end of a bi-directional communication link between two applications over a computer network. A socket often gets bound to a given port, which lets the transport layer protocol such as User Datagram Protocol (UDP), Transmission Control Protocol (TCP), or the like identify which application to send the data to. The dynamic socket waveform is a dynamically configurable RF socket central to the construction of networks meeting the modern challenge. The dynamic socket waveform extends the notion of a network socket from the Open Systems Interconnection (OSI) transport layer through network, media access, logical link control, and physical layers.

According to the OSI standard, physical layers are connected to the network at respective hosts, the physical layers providing transmission and receipt of raw data bits via the network. A data link layer is serviced by the physical layer of each host, the data link layers providing frame division and error correction to the data received from the physical layers, as well as processing acknowledgment frames sent by the receiving host. A network layer of each host is serviced by respective data link layers, the network layers primarily controlling size and coordination of subnets of packets of data.

A transport layer is serviced by each network layer and a session layer is serviced by each transport layer within each host. Transport layers accept data from their respective session layers and split the data into smaller units for transmission to the other host's transport layer, which concatenates the data for presentation to respective presentation layers. Session layers allow for enhanced communication control between the hosts. Presentation layers are serviced by their respective session layers, the presentation layers translating between data semantics and syntax which may be peculiar to each host and standardized structures of data representation. Compression and/or encryption of data may also be accomplished at the presentation level. Application layers are serviced by respective presentation layers, the application layers translating between programs particular to individual hosts and standardized programs for presentation to either an application or an end user. The TCP/IP (Internet Protocol) standard includes the lower four layers and application layers, but integrates the functions of session layers and presentation layers into adjacent layers. Generally speaking, application, presentation and session layers are defined as upper layers, while transport, network and data link layers are defined as lower layers.

The rules and conventions for each layer are called the protocol of that layer, and since the protocols and general functions of each layer are roughly equivalent in various hosts, it is useful to think of communication occurring directly between identical layers of different hosts, even though these peer layers do not directly communicate without information transferring sequentially through each layer below. Each lower layer performs a service for the layer immediately above it to help with processing the communicated information. Each layer saves the information for processing and service to the next layer. Due to the multiplicity of hardware and software architectures, devices and programs commonly employed, each layer is necessary to insure that the data can make it to the intended destination in the appropriate form, regardless of variations in hardware and software that may intervene.

In preparing data for transmission from a first host to a second host, some control data is added at each layer of the first host regarding the protocol of that layer, the control data being indistinguishable from the original (payload) data for all lower layers of that host. Thus an application layer attaches an application header to the payload data and sends the combined data to the presentation layer of the sending host, which receives the combined data, operates on it and adds a presentation header to the data, resulting in another combined data packet. The data resulting from combination of payload data, application header and presentation header is then passed to the session layer, which performs required operations including attaching a session header to the data and presenting the resulting combination of data to the transport layer. This process continues as the information moves to lower layers, with a transport header, network header and data link header and trailer attached to the data at each of those layers, with each step typically including data moving and copying, before sending the data as bit packets over the network to the second host.

The receiving host generally performs the converse of the above-described process, beginning with receiving the bits from the network, as headers are removed and data processed in order from the lowest (physical) layer to the highest (application) layer before transmission to a destination of the receiving host. Each layer of the receiving host recognizes and manipulates only the headers associated with that layer, since to that layer the higher layer control data is included with and indistinguishable from the payload data. Multiple interrupts, valuable central processing unit (CPU) processing time and repeated data copies may also be necessary for the receiving host to place the data in an appropriate form at its intended destination.

While the traditional socket application programmer interface (APT) contains parameters to select transport and network protocols, the dynamic socket waveform adds parameters describing point-to-point and multi-point communications protocols, media access modes, TRANSEC characteristics and SIS parameters. Via this means, special purpose data links may be constructed and torn down in an ad hoc and dynamic manner. The dynamic socket waveform forms a means for flexibly configuring a SDR in a common manner.

Referring now to FIG. 1, a communications device 100 (e.g., a radio, or the like) capable of operation with dynamic sockets is shown. The communications device 100 includes high band channel radio resources 102 capable of communications at 900-2800 MHz, and socket radio resources 104 capable of communications at 30-1000 MHz. The high band channel radio resources section 102 and the socket radio resources section 104 are significantly separated in frequency so that the high band channel radio resources 102 and the socket radio resources 104 are suitable for concurrent operation with no interference and minimal isolation, co-site problems to solve in the communications device 100. The high band channel radio resources 102 may be suitable for communications with Link-16, Tactical Targeting Network Technology (TTNT), Wideband Networking Waveform (WNW) high band waveform, or any number of high frequency links. The socket radio resources 104 may be suitable for creating and varying MAC and SIS approaches on the fly based upon application needs. Preferably, the socket radio resources 104 may also be suitable for legacy modulation and control with a link such as Single-Channel Ground-Air Radio System (SINGARS), HAVQuick, or the like.

Figure 2:
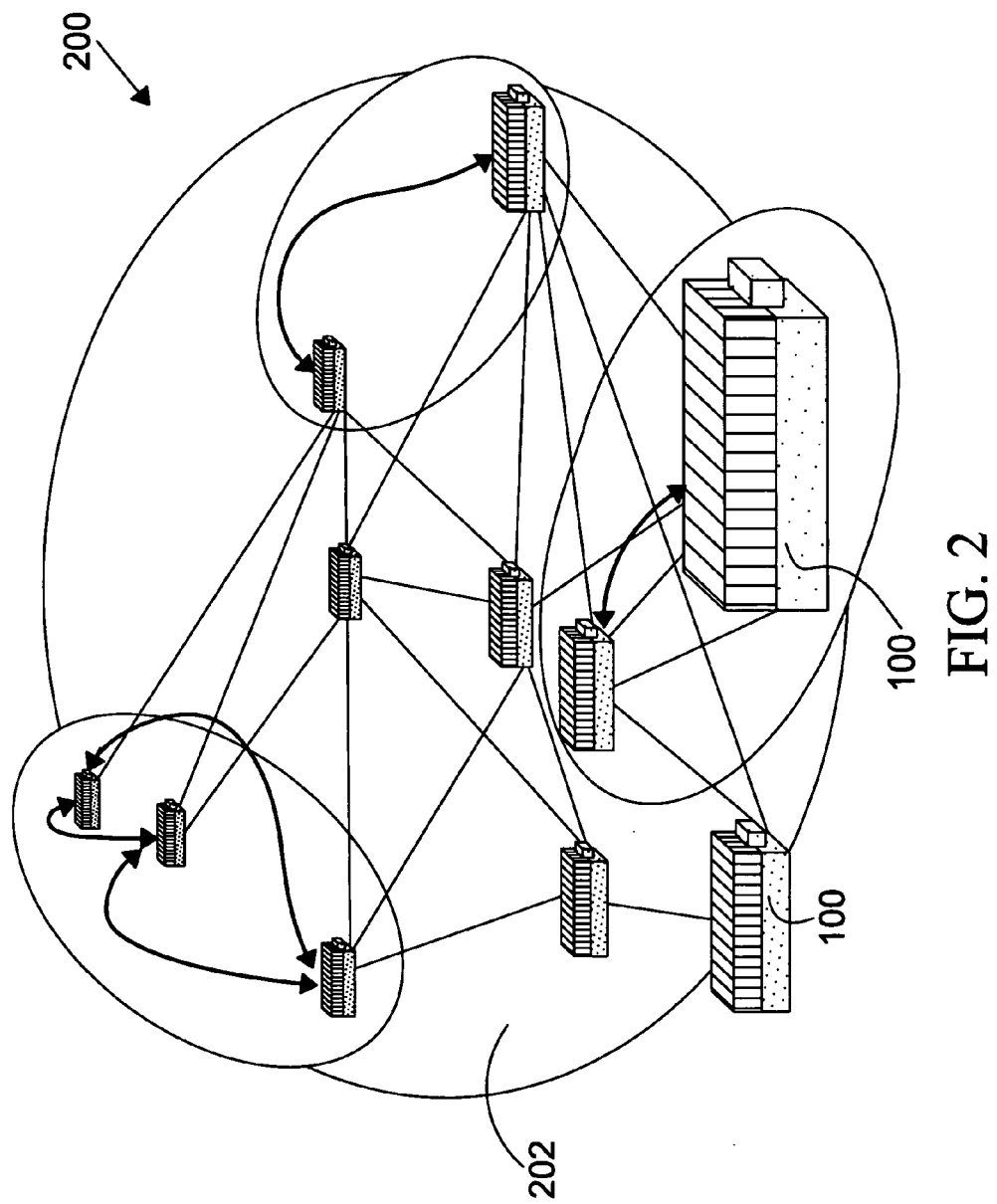
FIG. 2 is a schematic diagram illustrating a system capable of operation with dynamic sockets in accordance with an exemplary embodiment of the present invention.
Figure 3:
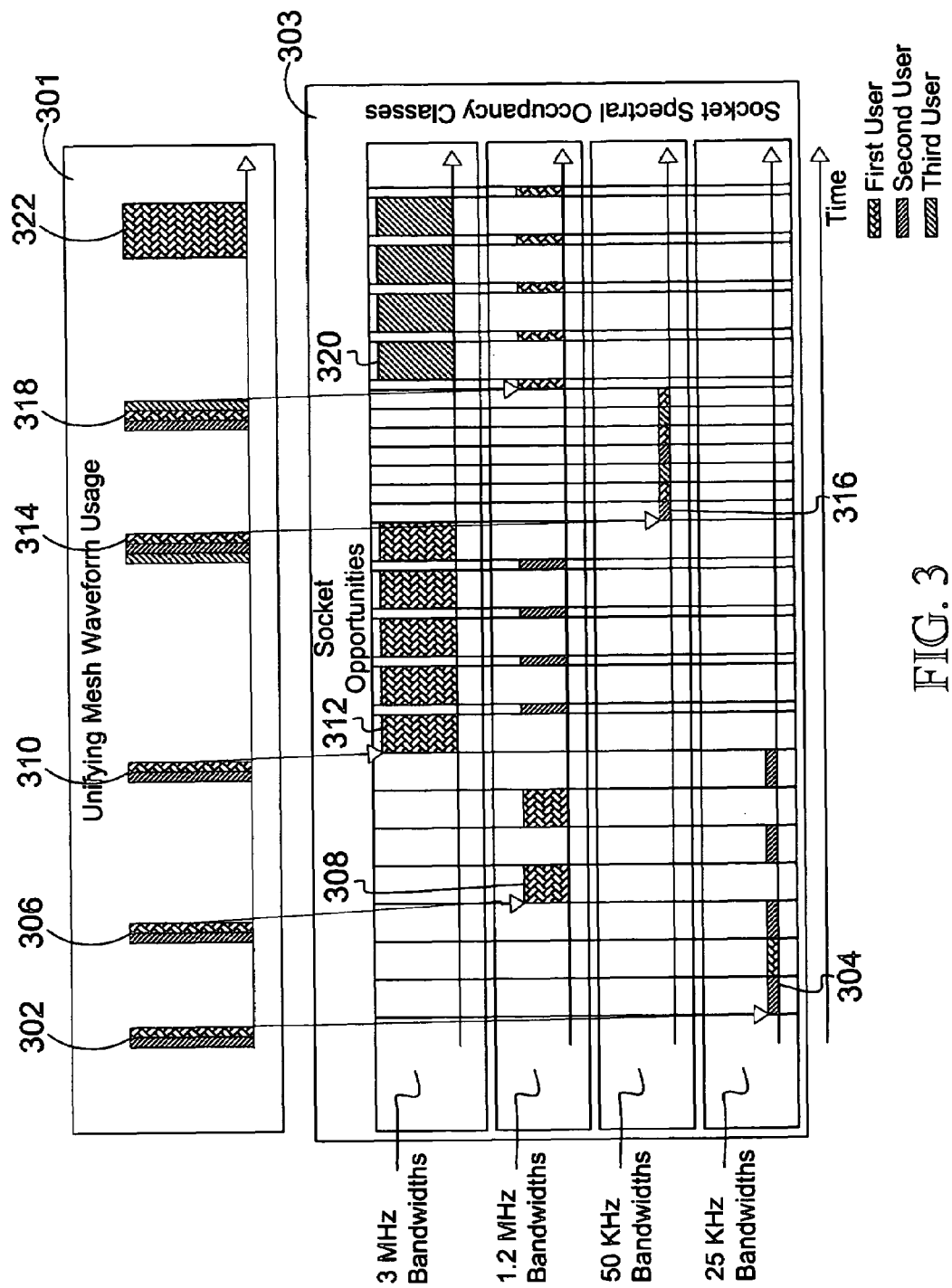
FIG. 3 is a schematic diagram illustrating dynamic socket Media Access Control (MAC)/Signal-In-Space (SIS) utilization in accordance with an exemplary embodiment of the present invention.

The purpose for dual band radio coverage is demonstrated in a topology manner in FIG. 2 and in a MAC/SIS manner in FIG. 3. FIG. 2 shows a system 200 capable of operation with dynamic sockets in a topology manner. The system 200 includes a plurality of communications devices such as the communications devices 100 shown in FIG. 1. For example, the communications device 100 may be a dual channel 10 in$^2$ radio. Each of the plurality of communications devices 100 includes high band channel radio resources capable of communications at 900-2800 MHz and socket radio resources capable of communications at 30-1000 MHz. The high band channel radio resources and the socket radio resources are significantly separated in frequency so that the high band channel radio resources and the socket radio resources are suitable for concurrent operation with no interference and minimal isolation, co-site problems to solve in each of the plurality of communications devices 100. The socket radio resources may be suitable for creating and varying MAC and SIS approaches on the fly based upon application needs and may be suitable for legacy modulation and control with a link such as SINGARS, HAVQuick or the like.

The plurality of communications devices 100 are connected to a unifying mesh network 202 by the high band channel radio resources. The unifying mesh network 202 may be suitable for allowing each communications devices 100 to communicate with any other communications device 100 or all other communications devices 100 through a high performance low latency ad hoc link such as Tactical Targeting Network Technology (TTNT), Wideband Networking Waveform (WNW), Short Range Wireless (SRW), or the like. When specific user connectivity needs arise that present a need for significant data transfer between a number of communications devices 100, a dynamic socket connection may be negotiated on the unifying mesh network 202, and then formed with the socket radio resources 30-1000 MHz. The dynamic socket formation may allow the network 202 to offload continuous receiver-directed or multicast traffic from the unifying mesh network channel, thereby freeing up valuable public ad hoc communications bandwidth. As shown in FIG. 2, sockets may be formed between any number of communications devices 100 (2, 3, 4, . . . , N). The sockets may be formed with all communications devices 100 of equal bandwidth, or asymmetrically in an extreme only providing listening socket capability to some communications devices 100. The sockets may be formed or terminated quickly at any point in time as facilitated by the unifying mesh network 202.

FIG. 3 illustrates dynamic socket activities with respect to three users: First, Second, and Third. First user is the main user in the scenario. FIG. 3 has two main block sections: the top section 301 illustrates the dynamic socket related communications that occur on the unifying mesh waveform, and the bottom section 303 shows real time dynamic docket utilization classified by bandwidth utilization (instantaneous bandwidth). A Time Division Multiple Access (TDMA) example for the dynamic socket waveform is utilized to provide a simple illustration. FIG. 3 may illustrate the ability of the dynamic socket to real time optimize for varying data rate and user connectivity through a process. Second user initiates a conversation with First user using unifying mesh waveform to propose a dynamic socket, and First user accepts 302. Second and First users are able to jump directly to the proposed 25 kHz TDMA socket, and in the socket Second user asks for video content and sees available sensor content of First user 304. Second user asks First user for an image preview of First user's video sensor source on the unifying mesh waveform, and First user accepts 306. First user makes the 1.2 MHz dynamic socket channel image dump to Second user in a TDMA fashion such as may be negotiated on the unifying mesh waveform 308. Second user likes the video preview and asks First user to initiate a video stream on a 3 MHz/1.2 MHz hybrid TDMA dynamic socket structure, and First user agrees 310. First and Second users start the video feed interaction on the negotiated TDMA structure, while other users may tune in and receive the video transmission as directed on the unifying mesh network 312. Third user requests to join Second and First users at a high priority level, and Second and First users agree and terminate the video feed socket 314. Third, Second, and First users start a conversation in the negotiated 50 kHz bandwidth TDMA format 316. Second user decides to drop out of the socket conversation 318. First user asks Third user to initiate a video stream on a 3 MHz/1.2 MHz hybrid TDMA structure, and Third users agrees 320. First user transmits a broadcast image on the unifying mesh waveform to show off the independence of the socket and mesh channels 322.

Figure 4:
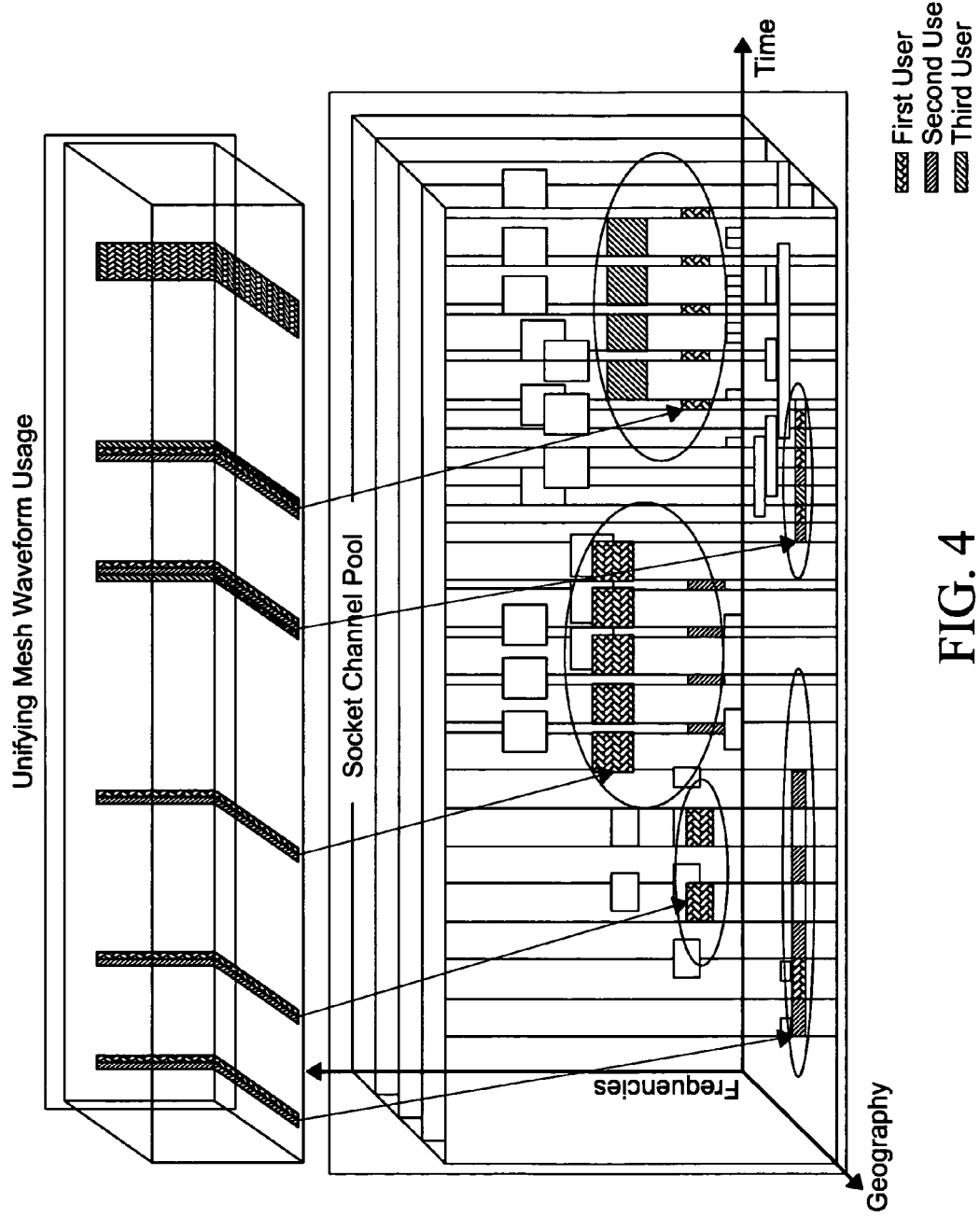
FIG. 4 is a schematic diagram illustrating dynamic socket channel assignment in accordance with an exemplary embodiment of the present invention.

FIG. 4 illustrates the spectral allocation dimension of the dynamic socket waveform concept. One of the greatest strengths of the dynamic socket comes from the efficient bandwidth utilization and real time capacity optimization that occurs. This technique enables the system to take advantage of geographic and time based spectral reuse, thus, getting an on the fly XG spectral assignment, and cellular geographic reuse efficiency gains. The potential spectral usage gains are scenario driven, but when paired with intelligent power control, they are gigantic 10×-1000× and on. FIG. 4 illustrates the socket spectral usage in geography, frequency, and time, where the traffic from the FIG. 3 scenario is circled in oval. The spectral management responsibility is handled by the Organization and Control Proxy (OCP) disclosed in the co-pending U.S. patent application Ser. No. 11/338,307, filed Jan. 24, 2006.

The present invention may have the following advantages. First, the present dynamic socket waveforms may increase user capacity of a system such as TTNT by an order of magnitude or more by allowing for coordinated spectral sharing and by adding to the system bandwidth. Additionally, the present invention may enable low latency real time optimization of bandwidth utilization, latency, user connectivity, connectivity topology, and the like. Moreover, the present dynamic sockets may operate with no addressing or messaging overhead so that the communications link bandwidth may be retained for data. Further, the present invention may allow extension of ad hoc responsiveness of links such as TTNT to bands such as UHF or VHF to take advantage of excellent propagation and computational simplicity, which allows for power/computation efficient communications techniques.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for operating with dynamic sockets, comprising:
   a plurality of communications devices, each of said plurality of communications devices including high band channel radio resources capable of communications at 900-2800 MHz and socket radio resources capable of communications at 30-1000 MHz, said high band channel radio resources and said socket radio resources being significantly separated in frequency so that said high band channel radio resources and said socket radio resources are suitable for concurrent operation with no interference and minimal isolation, co-site problems to solve in said each of said plurality of communications devices,
   wherein said plurality of communications devices are connected to a unifying mesh network by said high band channel radio resources, said unifying mesh network being suitable for allowing said plurality of communications devices to communicate with one another, and
   wherein when data needs to be transferred among a group of communications devices selected from said plurality of communications devices, a dynamic socket connection is negotiated on said unifying mesh network and is then formed with said socket radio resources, said dynamic socket formation being suitable for allowing said unifying mesh network to offload continuous receiver-directed or multicast traffic from a channel of said unifying mesh network and to free up public ad hoc communications bandwidth of said unifying mesh network.

2. The system of claim 1, wherein said unifying mesh network is suitable for allowing said plurality of communications devices to communicate with one another through a high performance low latency ad hoc link.

3. The system of claim 2, wherein said high performance low latency ad hoc link is Tactical Targeting Network Technology (TTNT), Wideband Networking Waveform (WNW), or Short Range Wireless (SRW).

4. The system of claim 1, wherein said socket radio resources are suitable for creating and varying Media Access Control and Signal In Space (SIS) approaches on the fly based upon application needs.

5. The system of claim 4, wherein said socket radio resources are suitable for legacy modulation and control with a link.

6. The system of claim 5, wherein said link is Single-Channel Ground-Air Radio System (SINGARS) or HAVQuick.

7. The system of claim 1, wherein said group of communications devices includes two or three communications devices.

8. The system of claim 1, wherein sockets of said group of communications devices are formed with communications devices of equal bandwidth.

9. The system of claim 1, wherein sockets of said group of communications devices are formed asymmetrically so that at least one of said group of communications devices is provided only with listening socket capability.

10. The system of claim 1, wherein sockets of said group of communications devices are formed or terminated quickly at a point in time as facilitated by said unifying mesh network.

11. A method for operating with dynamic sockets, comprising:

providing a plurality of communications devices, each of said plurality of communications devices including high band channel radio resources capable of communications at 900-2800 MHz and socket radio resources capable of communications at 30-1000 MHz, said high band channel radio resources and said socket radio resources being significantly separated in frequency so that said high band channel radio resources and said socket radio resources are suitable for concurrent operation with no interference and minimal isolation, co-site problems to solve in said each of said plurality of communications devices;

connecting said plurality of communications devices to a unifying mesh network by said high band channel radio resources, said unifying mesh network being suitable for allowing said plurality of communications devices to communicate with one another;

negotiating, when data needs to be transferred among a group of communications devices selected from said plurality of communications devices, a dynamic socket connection on said unifying mesh network; and forming said dynamic socket connection with said socket radio resources for allowing said unifying mesh network to offload continuous receiver-directed or multicast traffic from a channel of said unifying mesh network and to free up public ad hoc communications bandwidth of said unifying mesh network.

12. The method of claim 11, wherein said unifying mesh network is suitable for allowing said plurality of communications devices to communicate with one another through Tactical Targeting Network Technology (TTNT), Wideband Networking Waveform (WNW), or Short Range Wireless (SRW).

13. The method of claim 11, wherein said forming comprises forming sockets of said group of communications devices with communications devices of equal bandwidth.

14. The method of claim 11, wherein said forming comprises forming sockets of said group of communications devices asymmetrically so that at least one of said group of communications devices is provided only with listening socket capability.

15. The method of claim 11, wherein sockets of said group of communications devices are formed or terminated quickly at a point in time as facilitated by said unifying mesh network.

\* \* \* \* \*